United States Patent
Kruse et al.

(10) Patent No.: US 8,005,941 B2
(45) Date of Patent: Aug. 23, 2011

(54) METHOD AND SYSTEM FOR EVENT TRANSMISSION

(75) Inventors: Eckhard Kruse, Heidelberg (DE); Zaijun Hu, Ludwigshafen (DE); Yauheni Veryha, Mannheim (DE); Jens Doppelhamer, Ladenburg (DE)

(73) Assignee: ABB Research Ltd, Zurich (CH)

( * ) Notice: Subject to any disclaimer, the term of this patent is extended or adjusted under 35 U.S.C. 154(b) by 509 days.

(21) Appl. No.: 10/562,046

(22) PCT Filed: Apr. 10, 2004

(86) PCT No.: PCT/EP2004/003837
§ 371 (c)(1),
(2), (4) Date: Apr. 11, 2006

(87) PCT Pub. No.: WO2005/018193
PCT Pub. Date: Feb. 24, 2005

(65) Prior Publication Data
US 2006/0224699 A1    Oct. 5, 2006

(30) Foreign Application Priority Data
Jul. 17, 2003    (DE) .................... 103 32 360

(51) Int. Cl.
*G06F 15/173* (2006.01)
(52) U.S. Cl. ...................................... 709/224; 709/203
(58) Field of Classification Search .................. 709/224, 709/203; 713/100; 370/241, 242, 245
See application file for complete search history.

(56) References Cited

U.S. PATENT DOCUMENTS

| | | | | |
|---|---|---|---|---|
| 5,621,892 A | * | 4/1997 | Cook | 709/224 |
| 6,243,746 B1 | * | 6/2001 | Sondur et al. | 709/220 |
| 6,298,378 B1 | * | 10/2001 | Angal et al. | 709/223 |
| 6,349,333 B1 | * | 2/2002 | Panikatt et al. | 709/223 |
| 6,356,282 B2 | * | 3/2002 | Roytman et al. | 715/736 |
| 6,363,421 B2 | * | 3/2002 | Barker et al. | 709/223 |

(Continued)

FOREIGN PATENT DOCUMENTS
EP    0 825 506 A2    2/1998
(Continued)

OTHER PUBLICATIONS

Vinoski, Steve; "Distributed Object Computing With CORBA"; Aug. 1993; C++ Report Magazine; Hewlett-Packard Company; pp. 1-9.*

(Continued)

*Primary Examiner* — Faruk Hamza
*Assistant Examiner* — Jeffrey Nickerson
(74) *Attorney, Agent, or Firm* — Buchanan Ingersoll & Rooney PC

(57) ABSTRACT

The management and transmission of events from a server to at least one client via a communication connection includes a server that has at least one server event service communicating with at least one client via a communication connection and at least one unit interface communicating with the at least one server event service. The client includes at least one client event server communicating with the server via the communication connection. Logging of possible events takes place in both the client event server and the server event service. Incident events are passed from the unit interface to the server event service. A client event service initiates requests to the server event service and, based on a submitted request to the server event service, the recorded events are transmitted to the client event service. Events received from the client event service are transmitted to a client application.

14 Claims, 3 Drawing Sheets

U.S. PATENT DOCUMENTS

Figure 1:
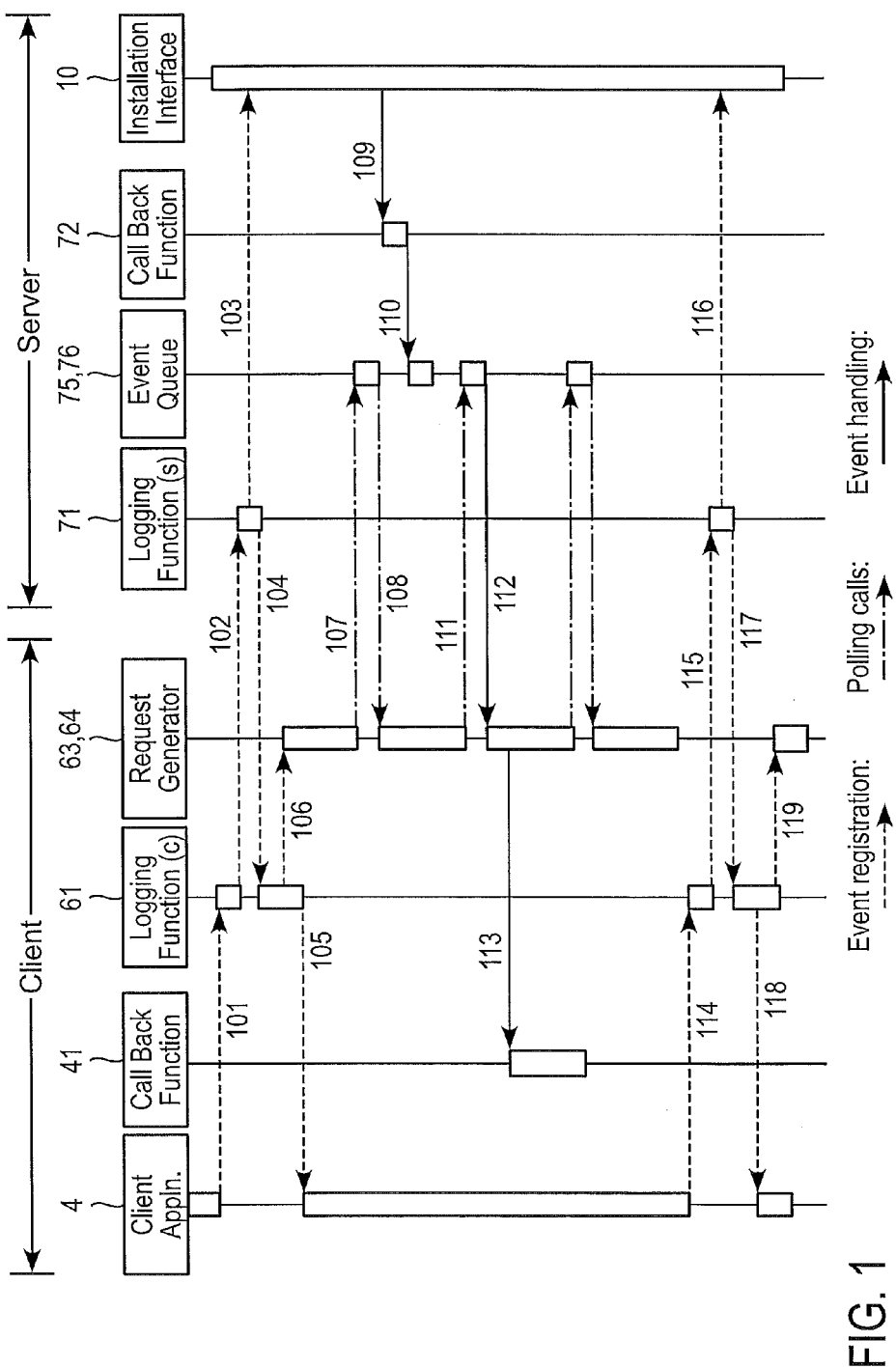

| | | | |
|---|---|---|---|
| 6,378,004 B1* | 4/2002 | Galloway et al. | 719/321 |
| 6,430,616 B1* | 8/2002 | Brinnand et al. | 709/224 |
| 6,470,388 B1* | 10/2002 | Niemi et al. | 709/224 |
| 6,473,407 B1 | 10/2002 | Ditmer et al. | |
| 6,664,978 B1* | 12/2003 | Kekic et al. | 715/733 |
| 6,788,315 B1* | 9/2004 | Kekic et al. | 715/733 |
| 7,010,586 B1* | 3/2006 | Allavarpu et al. | 709/223 |
| 7,107,497 B2* | 9/2006 | McGuire et al. | 714/48 |
| 7,152,104 B2* | 12/2006 | Musante et al. | 709/224 |
| 7,552,445 B2* | 6/2009 | Green | 719/318 |
| 2002/0016867 A1* | 2/2002 | Kampe et al. | 709/318 |
| 2002/0103927 A1 | 8/2002 | Parent | |
| 2002/0112058 A1* | 8/2002 | Weisman et al. | 709/227 |
| 2003/0018705 A1 | 1/2003 | Chen et al. | |
| 2003/0037102 A1 | 2/2003 | Eckert et al. | |
| 2004/0030775 A1* | 2/2004 | Lauzon et al. | 709/224 |
| 2004/0226022 A1* | 11/2004 | Prabhu | 719/315 |

FOREIGN PATENT DOCUMENTS

| | | |
|---|---|---|
| EP | 0 996 253 A2 | 4/2000 |
| WO | 98/53581 A1 | 11/1998 |
| WO | 01/09740 A1 | 2/2001 |

OTHER PUBLICATIONS

*International Search Report dated Jul. 14, 2004.

* cited by examiner

METHOD AND SYSTEM FOR EVENT TRANSMISSION

This application is based on and claims priority to German Application No. 103 32 360.0, filed on Jul. 17, 2003 and International Application No. PCT/EP2004/003837, filed on Apr. 10, 2004 designating the U.S., the entire contents of both of which are hereby incorporated by reference.

The invention relates to a method and a system for transmitting events in a web-based client/server environment from a server to a client, particularly for transmitting alarm and event messages from a technical installation which is to be monitored. In this context and in the text below, the transmission of an event is to be understood to mean, in particular, the transmission of information which describes an event.

Client/server systems are often used for locally monitoring and also for controlling technical installations, such as production installations, or buildings control engineering installations. In this context, the respective technical installation is usually equipped with a data capture unit, for example a programmable logic controller (PLC), which detects events and alarms occurring in the installation and transmits them to a control computer. Normally, the control computer is in physical proximity to the installation and is connected to the data capture unit by a bus system. The control computer has, inter alia, a database, which contains an up-to-date map of the state of the installation, and an event list, which is used to enter and store the events, particularly state changes, which have been transmitted by the data capture unit. The control computer acts as a server which uses a communication link, for example the Internet, to interchange data with one or more clients which is/are physically separate from the server.

The client has an application which acts as an interface to the operator and which can be used to monitor and control the technical installation. It is a fundamental task of such a client/server system to transmit events occurring in the installation as quickly as possible to the application on the client (client application).

In ordinary communication networks based on the request/response model, such as the Internet, the server is not able to send messages to the client actively itself. It is therefore not able to transmit events spontaneously to one or more clients. In conventional client/server systems, the respective client makes requests for event transmission to the server, whereupon the server transmits the events which have occurred since the last request. This method does not meet the requirements of event transmission where the server must actively notify the clients about events which occur.

It is an object of the invention to provide a method and a system for managing and transmitting events from a server to a client in which the client sees the data transmission being initiated by the server.

The invention achieves the object by means of a method having the features specified in claim 1. A corresponding system and advantageous refinements are specified in further claims and in the description of the figures.

In the inventive method, for every event which needs to be transmitted from a server via a communication link to a client, for example a client application, the event is logged using a client event service and a server event service. Only events for which logging has been performed are transmitted from the server to the client. Such event logging prompts a respective update, or the first logging prompts an initialization, of the client/server system. When an event occurs, it is first reported to an installation interface of the server. If the event in question has been logged, it is transferred from the installation interface to the server event service. The client event service uses the communication link to make requests for event transmission to the server event service, for example periodically. If there is an event which has been detected by the server event service, it is transmitted via the communication link to the client event service on the basis of the received request. Within the client, the client event service transmits received events to the client application, where the event is reported, for example, by producing an entry which describes the event in an event list. Transmitting an event which has occurred to the client application therefore requires no active requests from the client application. Since the client application does not communicate with the server but rather only with the client event service, it is independent of the server. When the method is used, the client application sees the event handling operation taking place as in a local environment.

One application of the inventive method is monitoring technical installations, for example. In this case, events which are to be transmitted are detected by the data capture unit of a technical installation which is to be monitored and are reported to the server's installation interface.

In one advantageous refinement of the invention, the client application logs an appropriate client callback function in the client event service for every event about which it is to be notified. The client event service then uses the communication link to log a corresponding server callback function in the server event service. This logging is carried out separately for every event about which the client application is to be notified. In this way, it is possible to handle all events independently of one another.

Advantageously, an association is made, for example in the form of a list, in preparation for the method, so that this association is used to assign a unique name to every event possibly occurring in the installation. This association exists in the client and in the server. It is thus ensured that every event has the same associated name in the client and in the server. To log the callback functions, the client application calls a client logging function from the client event service and provides it with the name of the event in question and with a pointer to the client callback function which is to be logged. The client logging function then generates a unique event identifier and transmits this event identifier together with the event name to a server logging function of the server event service via the communication link. The server logging function logs a server callback function with the installation interface by transferring the event name. The server logging function then stores a data record, which contains the event identifier, a pointer to the server callback function which is to be logged and possibly further data, such as the event name, in a server event table. The server logging function then uses the communication link to report back to the client logging function of the client event service that the logging operation has been performed. The client logging function then logs the client callback function by storing a data record, which contains the event identifier, a pointer to the client callback function which is to be logged and possibly further data, such as the event name, in a client event table.

It is advantageous if after a client callback function has been logged for the first time the client logging function starts a request generator in the client event service. From this time onward, the request generator makes requests for event transmission to the server event service. This ensures that the server event service receives only requests from clients for which events are also logged.

A further advantage is that the request generator makes the requests for event transmission to the server event service cyclically. In this context, the cycle time is variable and can thus be matched to the respective conditions.

In one advantageous refinement, events are transmitted in a plurality of steps. In this case, the installation interface first of all detects the event which has occurred and calls the server event service's server callback function which is logged for this event. The server callback function then produces an entry which describes the event in an event queue. Since a separate event queue is created for every client which communicates with the server, the entry is possibly produced in a plurality of event queues, if a plurality of clients have logged a callback function for this event. When the client event service next requests event transmission, the server event service reads the entry produced from the event queue associated with the client and transmits it to the client event service via the communication link. The client event service takes the entry received from the server event service and ascertains and calls the client callback function logged for this event. The client callback function then executes a defined action for the corresponding event in the client application, for example an entry is produced in an event list or a display is produced in a graphical representation.

In one advantageous refinement of the invention, a tidying function of the server event service is optionally called which monitors the communication with the client event service. If no more requests are transmitted by a client event service over a prescribable period of time, the tidying function recognizes that the client is no longer communicating with the server, and then deletes the server event table and the event queue. This ensures that unneeded resources, particularly memory space, are released again. During normal operation, the client event service cancels all event handling operations before it terminates communication with the server event service, as a result of which the resources are automatically released. It is the task of the tidying function to release resources when event handling operations have not been cancelled, for example after the client has failed or after unforeseen disconnection. The tidying function can be called by a user as required, for example, or it can be called automatically at stipulatable times, for example once daily. One efficient method involves additionally calling the tidying function automatically when functions of the server event service, for example the server logging function, are accessed.

The invention also relates to a system for managing and transmitting events from a server via a communication link to a client. The client to which the events from the installation are transmitted has, for the purpose of logging possible events, at least one client event service which uses the communication link, for example the Internet or an internal network, to make requests for event transmission to a server event service. In addition, the client event service transmits received events to a client application.

One use of the inventive system is monitoring technical installations, for example. To this end, the server's installation interface is connected to a data capture unit of a technical installation in order to read in events detected by the data capture unit.

In line with one advantageous refinement, the server event service has one or more server callback functions which can each be logged for at least one event. A server callback function is called by the installation interface when the event for which it is logged occurs.

In line with one advantageous development of the invention, the server event service has at least one server logging function for logging server callback functions, at least one server event table for holding data records which describe a respective log, and at least one event queue for holding entries which describe a respective event.

Another advantage is that the server event service has, for every client event service with which it communicates via the communication link, a separate client data record which respectively contains at least one server event table and an event queue. That is to say that for every client which has logged at least one server callback function a separate client data record is created in which the server event table and the event queue are combined.

In one advantageous refinement of the invention, the server event service has a tidying function which monitors all the available client data records and the communication with the associated client event services. If a client event service does not transmit any more requests over a prescribable period of time, the tidying function recognizes that the associated client is no longer communicating with the server, and then deletes the associated client data record. This ensures that unneeded resources, particularly memory space, are released again.

In one advantageous embodiment of the invention, the server event table contained in a client data record is in the form of a hash table. It holds data records which contain at least one event identifier and a pointer to the server callback function which is to be logged. Optionally, the data records may contain further data, for example the event name. A hash table affords the advantage that, by way of example, the event identifier can be used as a key for very efficient access to the associated data record, particularly when there are a large number of table entries to be managed. It is likewise possible to use other data structures such as trees, linear lists or simple arrays.

Advantageously, the client has at least one client callback function which can be logged for at least one event and which is called when the event for which it is logged occurs. The client callback function notifies the client application about an event which has occurred in the installation.

In this context, it is also advantageous that the client event service has at least one client logging function for logging one or more client callback functions. In addition, it has a client event table, for holding data records which describe the log, and a request generator for making cyclic requests to one or more server event services for event transmission.

In one advantageous embodiment of the invention, the client event table is also in the form of a hash table. It holds data records which contain at least one event identifier and a pointer to the client callback function which is to be logged. Optionally, the data records may contain further data, for example the event name.

Figure 2:
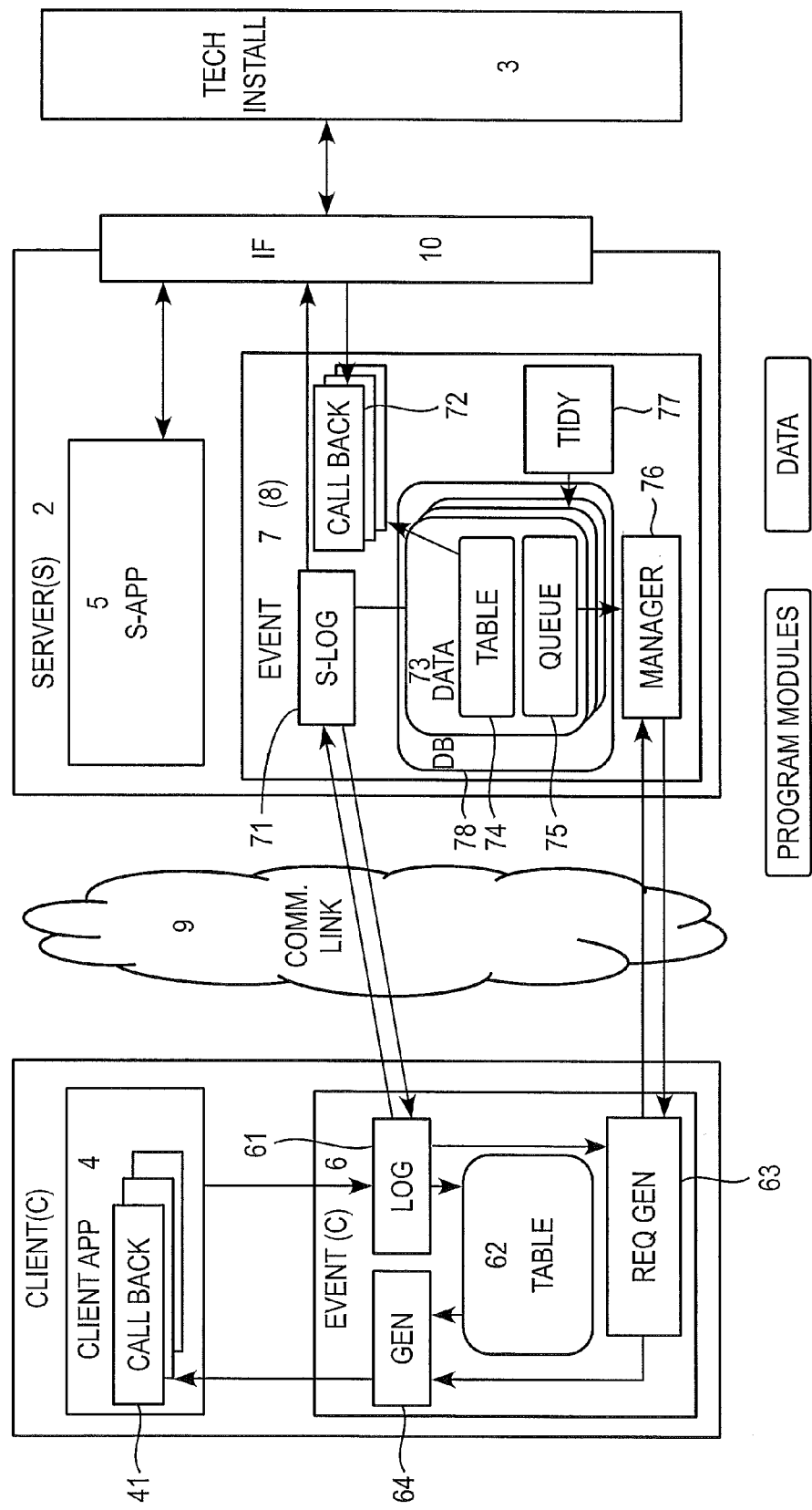
Figure 3:
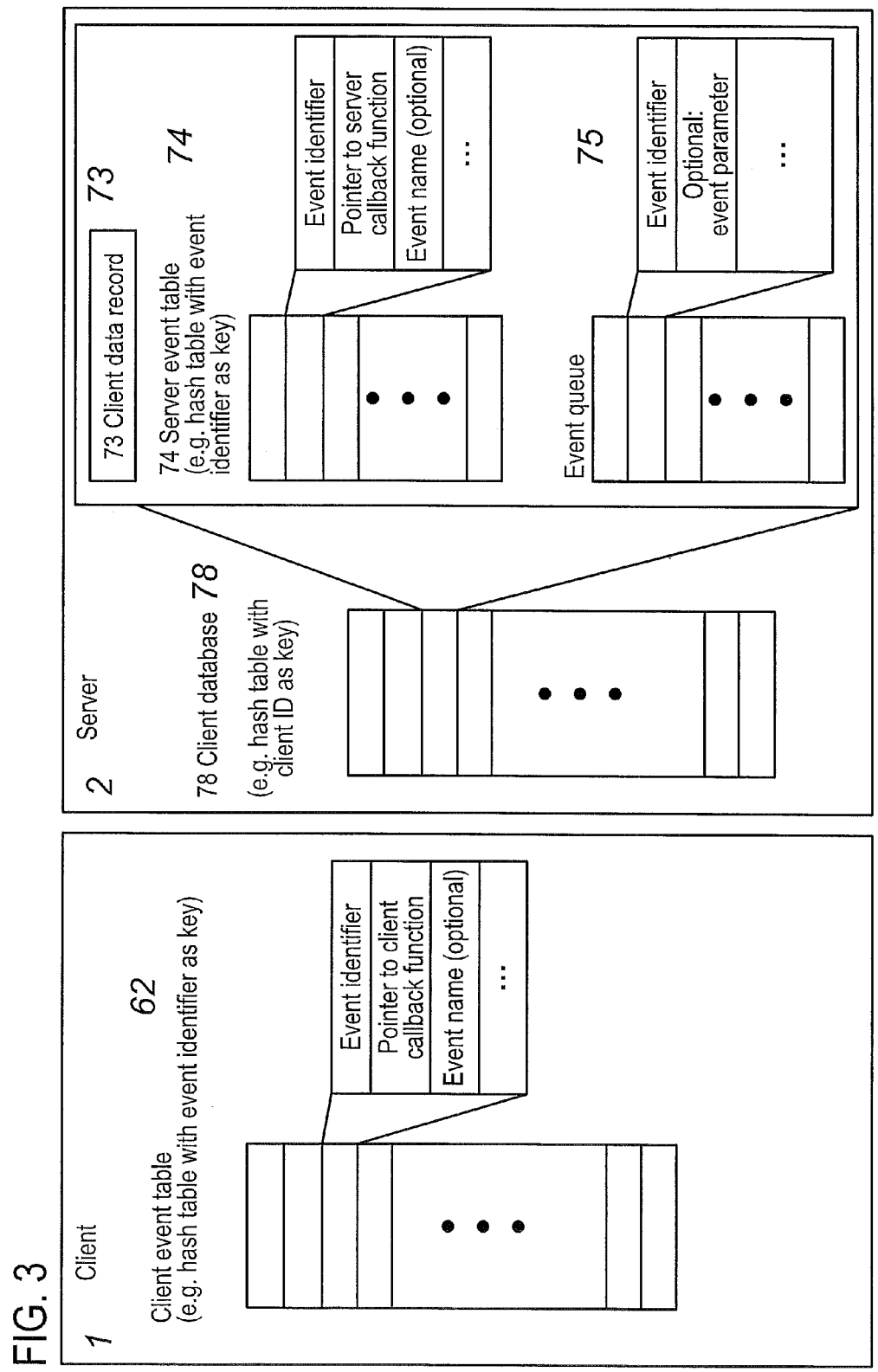

Exemplary embodiments and advantageous refinements of the invention are explained in more detail with reference to the drawings below, in which:

FIG. 1 uses a sequence diagram to show a method for registering and cancelling an event handling operation and for event transmission, FIG. 2 shows an exemplary architecture for a client/server system based on the invention, and FIG. 3 shows data structures for storing the data from the event handling operation.

FIG. 1 uses a sequence diagram to show the method for registering and cancelling an event handling operation and for transmitting events which have occurred to the client.

To register an event handling operation, in a first step 101 a client application 4 calls a client logging function 61. In a second step 102, the latter calls a server logging function 71 which, in a third step 103, then prompts appropriate logging in an installation interface 10 of the server. The result of the logging operation is returned to the client logging function 61 in a fourth step 104 and from there in a fifth step 105 to the client application 4. In addition, the first time that an event is logged, the client logging function 61 starts a request generator 63 in an additional step 106.

The request generator 63 runs in parallel with the other processes on the client and cyclically transmits requests to an event queue 75, or to a queue manager 76. In a first step 107, the request generator 63 makes a request to which the event queue 75 responds in a second step 108 by transmitting an event list. If there is no event to be transmitted, this event list is empty. The frequency with which the cyclic requests are made can be prescribed. An appropriate design needs to take account of the fact that the cycle time has a decisive influence on the maximum delay for notification about an event. On the other hand, the server is loaded to a greater extent by frequent requests when the cycles are short, which means that for the practical situation a compromise needs to be found between server loading and acceptable delay time. If an event for which logging has been performed occurs, the installation interface 10 calls a logged server callback function 72 in a third step 109. In a fourth step 110, this server callback function produces an appropriate entry in the event queue 75. On the basis of the next request from the request generator 63 in a fifth step 111, the entry is read from the event queue 75 and is returned to the client's request generator 63 in a sixth step 112. The request generator 63 then calls a logged client callback function 41 from the client application 4, possibly using a callback generator 64, in a seventh step 113.

To cancel an event handling operation, the client application 4 calls the client logging function 61 in a first step 114. In a second step 115, the client logging function 61 calls the server logging function 71, which then prompts the previous log to be removed from the server's installation interface 10 in a third step 116. The result of the log being removed is returned to the client logging function 61 in a fourth step 117 and from there to the client application 4 in a fifth step 118. If there are no further event handling operations for the client 4 after an event handling operation has been cancelled, the request generator 63 is stopped in an additional step 119.

FIG. 2 shows a possible architecture for the client/server system.

The system has a client 1 and a server 2 which communicate with one another via a communication link 9, for example the Internet.

The client 1 has one or more applications 4, such as user interfaces or application programs for installation control, which use the communication link 9 to communicate with server applications 5, for example to make database queries or to transmit control signals. If appropriate, the communication with the server 2 takes place via a representative (proxy) of the client, so that the client application 4 communicates with appropriate services of the client 1 only locally. The transmission via the Internet can take place using a web service or SOAP (Simple Object Access Protocol) calls, for example.

The client application 4 has a plurality of client callback functions 41 which can be logged when event handling operations are registered and which can be called when an event occurs. The client 1 also has a client event service 6 which performs the registration and cancellation operations for event handling operations for the client application 4 and which transmits events transmitted by the server 2 to the client application 4.

The client event service 6 has a client logging function 61, which can be called by the client application 4 in order to log a client callback function 41, and a client event table 62 into which the data from the event handling operation, such as event identifier, event name and pointer to client callback functions 41 which are to be logged, can be entered and from which these data can be read. In addition, the client event service 6 has a request generator 63 which cyclically transmits requests for event transmission to the server 2 and which holds events transmitted by the server 2. In addition, the client event service 6 has a callback generator 64 to which the request generator 63 forwards transmitted events and which calls the client callback function 41 logged for a relevant event.

The server 2 has an installation interface 10 which uses a local area network to communicate with a technical installation 3, for example its data capture unit. Instead of the local area network, there may also be a direct wired link or a radio link; communication via a global network such as the Internet is also possible. In addition, the server 2 has a server application 5 which is in the form of a database, for example, and which contains a map of the installation 3 which is to be monitored.

The server 2 also has a server event service 7 which performs the registration and cancellation operations for event handing operations and which transmits events transmitted by the installation interface 10 to the client event service 6 via the communication link 9.

The server event service 7 has a server logging function 71 which uses the communication link 9 to communicate with the client logging function 61 and which performs the logging operation for server callback functions 72 for events which occur both for the installation interface 10 and for the server event service 7. For this purpose, the server event service 7 has one or more server callback functions 72 which can be logged for events which occur and which can be called when an event occurs.

In addition, the server event service 7 has, for every client which communicates with the server, a server event table 74 into which the data from the event handling operation, such as event identifier, event name and a pointer to the server callback function 72 which is to be logged, can be entered. The server event service 7 also has, for every client which communicates with the server, an event queue 75 into which data records describing events which have occurred can be entered.

The server event table 74 and the associated event queue 75 each form a client data record 73. All the client data records 73 are combined in a client database 78 in the server event service 7.

The server event service 7 also has a queue manager 76 which responds to the requests from the request generator 63 and which takes entries from the event queue 75 and transmits them to the request generator 63.

In addition, the server event service 7 has a tidying function 77 which monitors the communication with the client event service 6 and which deletes the client data records 73 if the associated client event service 6 is no longer communicating with the server event service 7. If no more requests are received from a request generator 63 over a prescribable period of time, the tidying function 77 recognizes that the associated client 1 is no longer communicating with the server 2, and then deletes the associated client data record 73. In this case, said period of time can be prescribed to be significantly longer than the cycle time of the request generator 63, that is to say the period of time between two requests. This ensures that unneeded resources, particularly memory space, are released again.

The text below describes the method for registering an event handling operation with reference to the system shown in FIG. 2. To log a client callback function 41, the client application 4 calls the client logging function 61 from the client event service 6 and transfers a pointer to the client callback function 41 which is to be logged. The client logging function 61 then generates a unique event identifier which is used to associate the data from the event handling operation on the server 2 and on the client 1 with one another. The client logging function 61 then forwards the name of the event for which logging is to take place, together with the generated event identifier, to the server logging function 71 of the server event service 7 via the communication link 9. The server logging function 71 logs a server callback function 72 for the installation interface 10 by transferring the event name and a pointer to the server callback function 72. In addition, the server logging function 71 stores all the relevant data from the event handling operation, such as the event identifier, the event name and a pointer to the server callback function 72, in the server event table 74, which is part of a data record 73 stored for every client in the client database 78. Next, the server logging function 71 returns a message about successful logging of the event to the client logging function 61. The latter enters the event identifier, the event name and the pointer to the client callback function 41 into the client event table 62. If this has not already been done beforehand, the request generator 63 is started as a new parallel process which cyclically transmits requests for event transmission to the queue manager 76 of the server event service 7. This completes the registration of an event handling operation.

The text below describes the method for cancelling an event handling operation with reference to the system shown in FIG. 2. To remove an event handling operation, the client application 4 calls the client logging function 61. The client logging function 61 sends an appropriate message to the server logging function 71, which firstly notifies the installation interface 10 that the corresponding server callback function 72 has been released and then updates the appropriate client data record 73. To this end, the corresponding entry is removed from the server event table 74. In addition, the event queue 75 is then checked to determine whether it still contains as yet unrequested data records associated with the event handling operation. Depending on the instance of application, it is then appropriate likewise to delete the associated event data records or to leave them in the queue until they are requested by the request generator 63 of the client event service 6. If no more event handling operations are logged in the server event table 74 for the client 1 and if the event queue 75 is also empty, it is possible to remove the entire client data record 73. On the one hand, this saves system resources, but it requires a relatively high level of complexity to create the data record again when new event handling operations are logged. Once the removal of the event handling operation in the server event service 7 is complete, the server logging function 71 returns an appropriate message to the client logging function 61. The client logging function 61 then removes the appropriate entry from the client event table 62. If the client event table 62 has no more events logged in it, it is appropriate to stop the request generator 63 for cyclic requesting until new events are logged again. To ensure that there are no more unhandled events in the event queue 75 of the server 2, a last request to the queue manager 76 is made before the request generator 63 is stopped.

The text below describes the sequence of event transmission with reference to the system shown in FIG. 2. The data capture unit in the installation 3 detects an event, for example the exceeding of limit values or the activation of switches or sensors, and reports it to the installation interface 10. If a server callback function 72 has been logged for this event, the installation interface 10 calls the logged server callback function 72 and transfers the event name as a parameter. From the server event tables 74 for the various client data records 73, the server callback function 72 takes the event identifiers associated with the relevant event name and writes a respective data record describing the event to the event queues 75 of the associated client data records 73. This ends execution of the server callback function 72.

Alternatively, during the event logging, a separate instance of the server callback function 72 is created for every event which is to be logged, so that every entry in a server event table 74 has a dedicated callback function. In this case, the event name does not need to be stored in the server event tables 74. In the installation interface 10, the association between event name and instance of the server callback function 72 is known. When the event occurs, the installation interface 10 calls that instance of the server callback function 72 which is associated with the event name without transferring the event name as a parameter. This instance of the server callback function 72 takes the associated event identifiers from the server event tables 74 and writes a data record describing the event into the event queue 75 of the associated client data record 73.

The event is buffer-stored in the event queue 75 until the next request from the request generator 63 is transmitted to the queue manager 76. If the event queue 75 associated with the client 1 is empty, an empty event list is returned to the request generator 63. If an event has occurred beforehand, as described above, however, the queue manager 76 returns a list of events which have occurred in the meantime to the request generator 63. Each entry in the list contains the parameters associated with the event and the event identifier originally produced by the client logging function 61. The transmitted events are removed from the event queue 75. In the client event service 6, the result of the request from the request generator 63 is evaluated by the callback generator 64. The callback generator 64 takes the client callback function 41 associated with the respective event identifier from the client event table 62 and calls these client callback functions 41 using the event data as parameters.

FIG. 3 shows system-based data structures for storing the data from the event handling operation on the client 1 and on the server 2.

The client event service 6 stores data records in a client event table 62 for every event handling operation. Each of the data records contains an event identifier, a reference to the associated client callback function 41 and optionally an event name. The realization of the reference is dependent on the specific implementation, or on the programming language used. By way of example, C/C++ typically uses function pointers. The client event table 62 may advantageously be in the form of a hash table in which the event identifier is used as a key. This means that when an event arrives the associated data record can be found efficiently.

The server 2 stores data for every client 1 which has logged event handling operations. This can be done efficiently in a client database 78 which is in the form of a hash table and which is used for access with a client ID as a key. For every client 1, a dedicated client data record 73 is stored which contains a server event table 74 and an event queue 75 in addition to the client ID. The server event table 74 can be in the form of a hash table, in a similar manner to the client event table 62, and contains appropriate data records, but a reference to the server callback function 72 is stored as a callback function. The event queue 75 is appropriately in the form of a queue data structure, with the individual data records containing at least the event identifier and optionally further parameters which describe the event in more detail.

LIST OF REFERENCE SYMBOLS

1 Client
2 Server

3 Technical installation
4 Client application
5 Server application
6 Client event service
7 Server event service
9 Communication link
10 Installation interface
41 Client callback function
61 Client logging function
62 Client event table
63 Request generator
64 Callback generator
71 Server logging function
72 Server callback function
73 Client data record
74 Server event table
75 Event queue
76 Queue manager
77 Tidying function
78 Client database

The invention claimed is:

1. A method for managing and transmitting events from a server via a communication link to a client, said method comprising:
   logging possible events in a client event service for the purpose of initializing or updating the client,
   logging possible events in a server event service for the purpose of initializing or updating the server,
   transferring detected events which have been logged from an installation interface to the server event service,
   sending requests initiated by the client event service regarding the detected events to the server event service,
   transmitting the detected events to the client event service on the basis of a request which has been made to the server event service, and
   transmitting events received by the client event service to a client application,
   wherein the client application logs a client callback function in the client event service for every event about which the client application is to be notified, and the client event service uses the communication link to log a corresponding server callback function in the server event service, and
   wherein to log the callback functions for an event with which a same event name is associated with the client and with the server, the following steps are performed:
   calling, by the client application, a client logging function from the client event service and providing said client logging function with an event name and with a pointer to the client callback function which is to be logged,
   logging, by the client logging function, a unique event identifier,
   transmitting the event identifier and the event name via the communication link to a server logging function of the server event service,
   logging, by the server logging function, a server callback function with the installation interface by transferring the event name,
   storing, by the server logging function in a server event table, a data record, which contains at least the event identifier and a pointer to the server callback function which is to be logged,
   reporting, by the server logging function, performance of the logging to the client logging function of the client event service via the communication link, and
   logging, by the client logging function, the client callback function by storing a data record in a client event table, the data record containing at least the event identifier and a pointer to the client callback function which is to be logged.

2. The method as claimed in claim 1, wherein the detected events to be transmitted are detected by a data capture unit in a technical installation and are reported to the installation interface of the server.

3. The method as claimed in claim 1, wherein after a client callback function has been logged for the first time the client logging function starts a request generator which then makes requests for event transmission to the server event service.

4. The method as claimed in claim 3, wherein the request generator of the client event service makes the requests for event transmission to the server event service cyclically.

5. The method as claimed in claim 3, wherein events are transmitted by performing the following steps:
   detecting, by the installation interface, an event which has occurred and calling the server callback function logged for the event,
   producing, by the server callback function, an entry describing the event in at least one event queue,
   reading, by the server event service, the entry produced in the event queue upon the next request from the client event service for event transmission,
   transmitting the entry via the communication link to the client event service,
   receiving, by the client event service, the entry,
   ascertaining and calling the client callback function logged for the event, and
   executing, by the client callback function, a defined action for the corresponding event in the client application.

6. The method as claimed in claim 1, wherein a tidying function of the server event service is called which deletes the server event table and an event queue if the client event service is no longer communicating with the server event service.

7. The method as claimed in claim 1, wherein events are transmitted by performing the following steps:
   detecting, by the installation interface, an event which has occurred and calling the server callback function logged for this event,
   producing, by the server callback function, an entry describing the event in at least one event queue,
   reading, by the server event service, the entry produced in the event queue upon the next request from the client event service for event transmission,
   transmitting the entry via the communication link to the client event service,
   receiving, by the client event service, the entry,
   ascertaining and calling the client callback function logged for the event, and
   executing, by the client callback function, a defined action for the corresponding event in the client application.

8. A system for managing and transmitting events from a server via a communication link to at least one client, said system comprising:
   at least one client, each client configured as a microprocessor coupled to a memory, each client comprising:
   a client application, and
   a client event service, for logging possible events for initializing or updating the client, which uses a communication link to make requests regarding detected events to a server event service, and transmits received events to the client application; and a server configured as a microprocessor coupled to a memory, comprising:

a server event service, which has at least one server logging function for logging server callback functions, and for logging possible events for the purpose of initializing or updating the server, and which uses a communication link to transmit detected events to the client event service on the basis of a request which has been made to the server event service, at least one server event table for holding data records which describe a respective logging operation, which server event table is formed as a hash table and holds data records which contain at least one event identifier and a pointer to a server callback function which is to be logged, at least one event queue for holding entries which describe a respective event, and for transmitting received events to a client application, and at least one installation interface which transfers detected events to the server event service; and wherein the client application logs a client callback function in the client event service for every event about which the client application is to be notified, and the client event service uses the communication link to log a corresponding server callback function in the server event service, wherein to log callback functions for an event with which a same event name is associated with the client and with the server, the following is performed:

calling, by the client application, a client logging function from the client event service and providing said client logging function with an event name and with a pointer to the client callback function which is to be logged, logging, by the client logging function, a unique event identifier, transmitting the event identifier and the event name via the communication link to a server logging function of the server event service, logging, by the server logging function, a server callback function with the installation interface by transferring the event name, storing, by the server logging function in a server event table, a data record, which contains at least the event identifier and a pointer to the server callback function which is to be logged, reporting, by the server logging function, performance of the logging to the client logging function of the client event service via the communication link, and logging, by the client logging function, the client callback function by storing a data record in a client event table, the data record containing at least the event identifier and a pointer to the client callback function which is to be logged.

9. The system as claimed in claim 8, wherein the installation interface is connected to a data capture unit of a technical installation in order to read in events detected by the data capture unit.

10. The system as claimed in claim 8, wherein the server event service has at least one server callback function which can be logged for at least one event and which is called when an event for which it is logged occurs.

11. The system as claimed in claim 8, wherein the server event service has, for every client event service with which it communicates via a communication link, a separate client data record which respectively contains at least one server event table and at least one event queue.

12. The system as claimed in claim 11, wherein the server event service has a tidying function which deletes the client data record if the associated client event service is no longer communicating with the server event service.

13. The system as claimed in claim 8, wherein the client event service has at least one client logging function for logging client callback functions, at least one client event table for holding data records which describe the log, and at least one request generator for making cyclic requests for event transmission.

14. The system as claimed in claim 13, wherein the client event table is in the form of a hash table and holds data records which contain at least one event identifier and a pointer to a client callback function which is to be logged.

* * * * *